United States Patent
Singh et al.

(10) Patent No.: US 12,124,406 B2
(45) Date of Patent: Oct. 22, 2024

(54) AUTOMATIC MOUNT OF APPLICATION FILESYSTEM INTERMEDIATE SNAPSHOT CREATION TIMEPOINTS

(71) Applicant: Dell Products, L.P., Hopkinton, MA (US)

(72) Inventors: Ashutosh Kumar Singh, Bangalore (IN); Akshat Rathore, Thane (IN); Tobin George Joseph Pulikeel, Bangalore (IN)

(73) Assignee: Dell Products, L.P., Hopkinton, MA (US)

( * ) Notice: Subject to any disclaimer, the term of this patent is extended or adjusted under 35 U.S.C. 154(b) by 220 days.

(21) Appl. No.: 17/577,443

(22) Filed: Jan. 18, 2022

(65) Prior Publication Data

US 2023/0229627 A1     Jul. 20, 2023

(51) Int. Cl.
*G06F 16/11* (2019.01)
*G06F 16/17* (2019.01)
*G06F 16/18* (2019.01)

(52) U.S. Cl.
CPC ........ *G06F 16/128* (2019.01); *G06F 16/1734* (2019.01); *G06F 16/1865* (2019.01)

(58) Field of Classification Search
CPC . G06F 16/128; G06F 16/1865; G06F 16/1734
See application file for complete search history.

(56) References Cited

U.S. PATENT DOCUMENTS

| | | | | |
|---|---|---|---|---|
| 8,332,354 | B1* | 12/2012 | Chatterjee | G06F 11/1461 |
| | | | | 707/E17.007 |
| 10,152,415 | B1* | 12/2018 | Rajaa | G06F 11/2094 |
| 10,620,871 | B1* | 4/2020 | Mukku | H04L 67/1097 |
| 2007/0294495 | A1* | 12/2007 | Uchida | G06F 11/1469 |
| | | | | 711/162 |
| 2009/0013012 | A1* | 1/2009 | Ichikawa | G06F 11/1464 |
| 2015/0019495 | A1* | 1/2015 | Siden | G06F 11/1448 |
| | | | | 707/649 |

(Continued)

*Primary Examiner* — Vaishali Shah
(74) *Attorney, Agent, or Firm* — Anderson Gorecki LLP

(57) ABSTRACT

An Application Data Management System (ADMS) enables an application file system to be mounted at any selected reconstruction time ($T_R$). If the reconstruction time $T_R$ falls intermediate snapshot creation timepoints, the ADMS creates a version of the application file system at the selected reconstruction time $T_R$ using a snapshot of the data file from a previous application file system snapshot creation timepoint, and a snapshot of the log file from a subsequent application file system snapshot creation timepoint. The ADMS uses the snapshot of the log file from the subsequent snapshot creation timepoint to replay transactions on the snapshot of the data file from the previous snapshot creation timepoint up to the selected reconstruction time $T_R$. This enables the state of the application file system to be recreated and mounted at any arbitrary selected reconstruction time, even if the selected reconstruction time is not coincident with snapshot creation timepoints.

14 Claims, 6 Drawing Sheets

(56) References Cited

U.S. PATENT DOCUMENTS

| | | | |
|---|---|---|---|
| 2020/0301784 A1* | 9/2020 | Chen | G06F 3/0604 |
| 2021/0133034 A1* | 5/2021 | Gotkhindikar | G06F 11/1451 |
| 2021/0133241 A1* | 5/2021 | Xu | G06F 3/04847 |
| 2022/0229806 A1* | 7/2022 | Copley | G06F 3/065 |

* cited by examiner

AUTOMATIC MOUNT OF APPLICATION FILESYSTEM INTERMEDIATE SNAPSHOT CREATION TIMEPOINTS

FIELD

This disclosure relates to computing systems and related devices and methods, and, more particularly, to a method and apparatus for automatic mount of an application file system intermediate snapshot creation timepoints.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

Snapshots are point in time versions of an application file system that are created based on a service plan. An Application-Data Management System (ADMS) is used to attach a service plan to an application file system, which causes a storage system hosting the application file system to create snapshots of the application file system according to an intended cadence. Depending on the service plan, the storage system may create snapshots according to any desired cadence, for example on an hourly, daily, or weekly basis, and snapshots may also be created on-demand.

If the application file system is to be restored to an earlier point in time, conventionally the ADMS would enable the user to select one of the previous snapshots to cause the application file system to be rolled back to the point in time of creation of the selected snapshot. According to some embodiments, an Application Data Management System (ADMS) enables an application file system to be mounted at any selected reconstruction time ($T_R$). If the reconstruction time $T_R$ falls intermediate snapshot creation timepoints, the ADMS creates a version of the application file system at the selected reconstruction time $T_R$ using a snapshot of the data file of the application file system from a previous snapshot creation timepoint, and a snapshot of the log file of the application file system from a subsequent snapshot creation timepoint. The ADMS uses the snapshot of the log file from the subsequent snapshot creation timepoint to replay transactions on the snapshot of the data file from the previous snapshot creation timepoint up to the selected reconstruction time $T_R$. This enables the state of the application file system to be recreated at any arbitrary selected reconstruction time $T_R$, even if the selected reconstruction time $T_R$ is not coincident with one of the snapshot creation timepoints.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
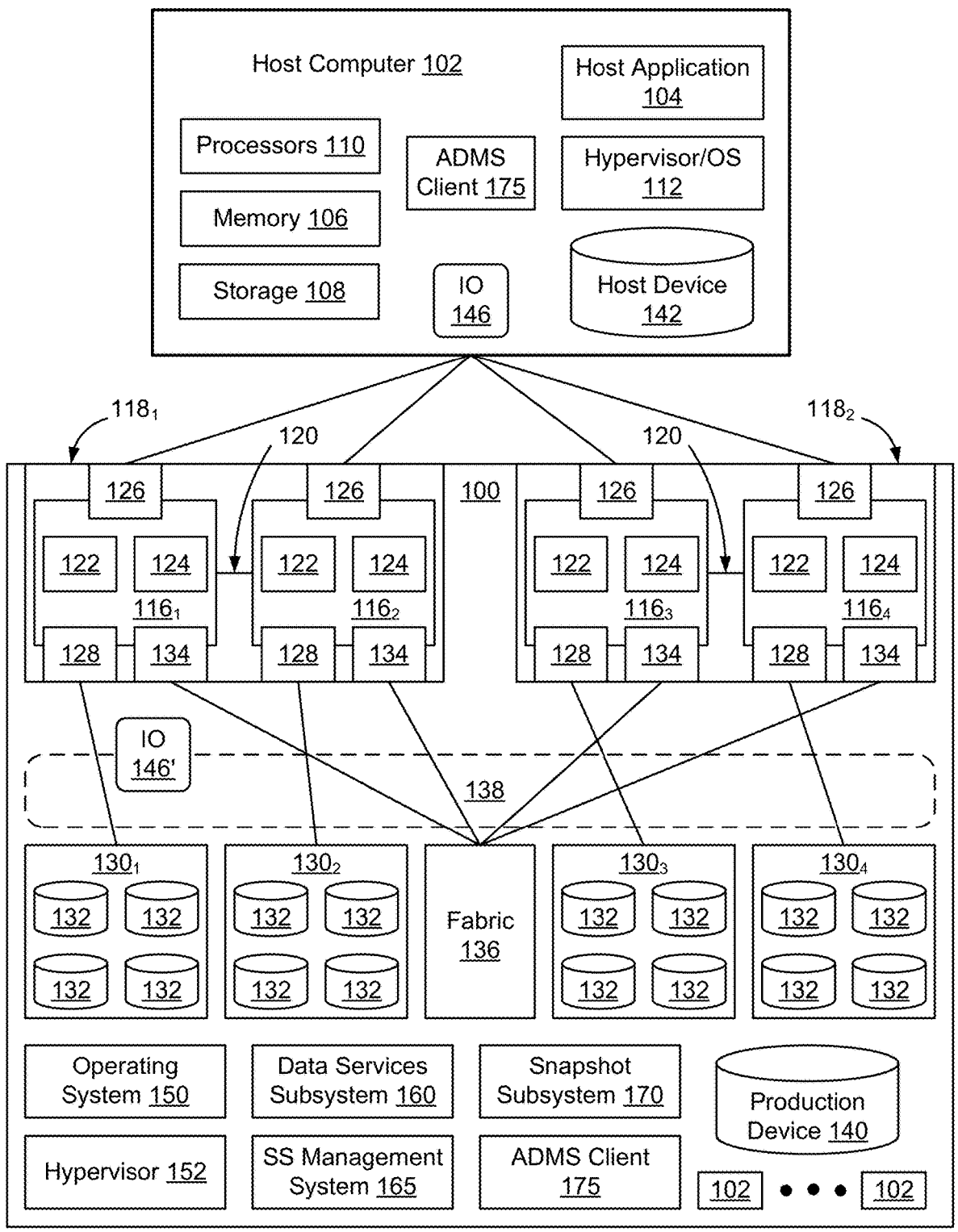
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM. Each compute node 116 may also include one or more front end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g. in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132.

Application 104 has access to host device 142, which application 104 uses to access its application file system that is stored on production device 140. An Application-Data Management System (ADMS) 250 (see FIG. 2) can be used in connection with application 104 to enable different file systems or different versions of a given file system to be mounted to host computer 102. The ADMS system 250 can also be used to simplify, orchestrate, and automate the process of generating and consuming application consistent copies of production data. By integrating with the storage system 100, an ADMS system 250 abstracts the underlying storage provided by the storage system 100 to provide a simple interface through which a service plan can be selected to be applied to a particular file system. Once a service plan has been selected, the underlying storage systems 100 implement the service plan to cause the storage system 100 to create snapshots of the user file system as specified in the service plan.

Figure 2:
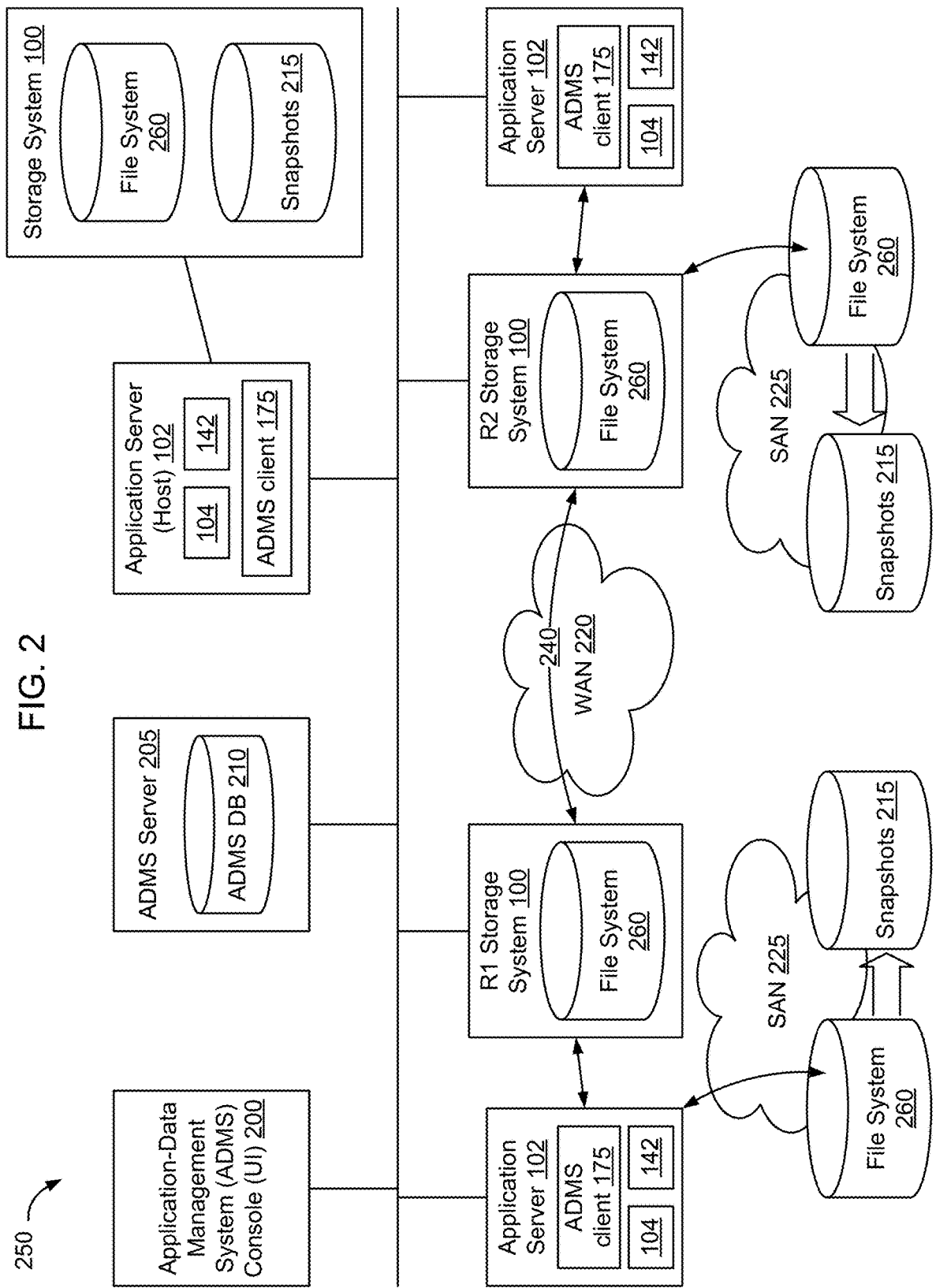
FIG. 2 is a functional block diagram of an Application-Data Management System (ADMS) architecture enabling automatic mount of an application file system intermediate snapshot creation timepoints, according to some embodiments.

FIG. 2 is a functional block diagram showing several primary components of an example Application-Data Management System (ADMS) 250, configured to enable automatic mount of an application file system intermediate snapshot creation timepoints, according to some embodiments. As shown in FIG. 2, in some embodiments the ADMS 250 includes an ADMS server 205 that maintains an ADMS database 210. The ADMS server 205 resides on a supported Windows system, and controls the service plans and stores data about each copy of each file system that it creates. In some embodiments, the ADMS database 210 is implemented as a PostgreSQL database on the ADMS server 205.

ADMS clients 175 are installed on the production hosts (storage systems 100) and mount hosts (host computers 102). The ADMS clients 175, in some embodiments, are light-weight agent plug-in software components. The ADMS clients 175 may be pushed from the ADMS server 205 to the production hosts and mount hosts when the hosts are added as a resource to the ADMS system 250. For example, in an AIX or Linux environment, a tar bundle may be pushed to the host during registration with the ADMS server 205. Alternatively, the ADMS clients 175 may be installed in the hosts manually.

An ADMS console 200 provides a user interface to the ADMS server 205 to control execution of the ADMS system 250. In some embodiments, the ADMS console 200 is a browser-based interface, and the ADMS server 205 has a REST interface that enables the ADMS console 200 to submit instructions to control operation of the ADMS server 205.

Figure 4:
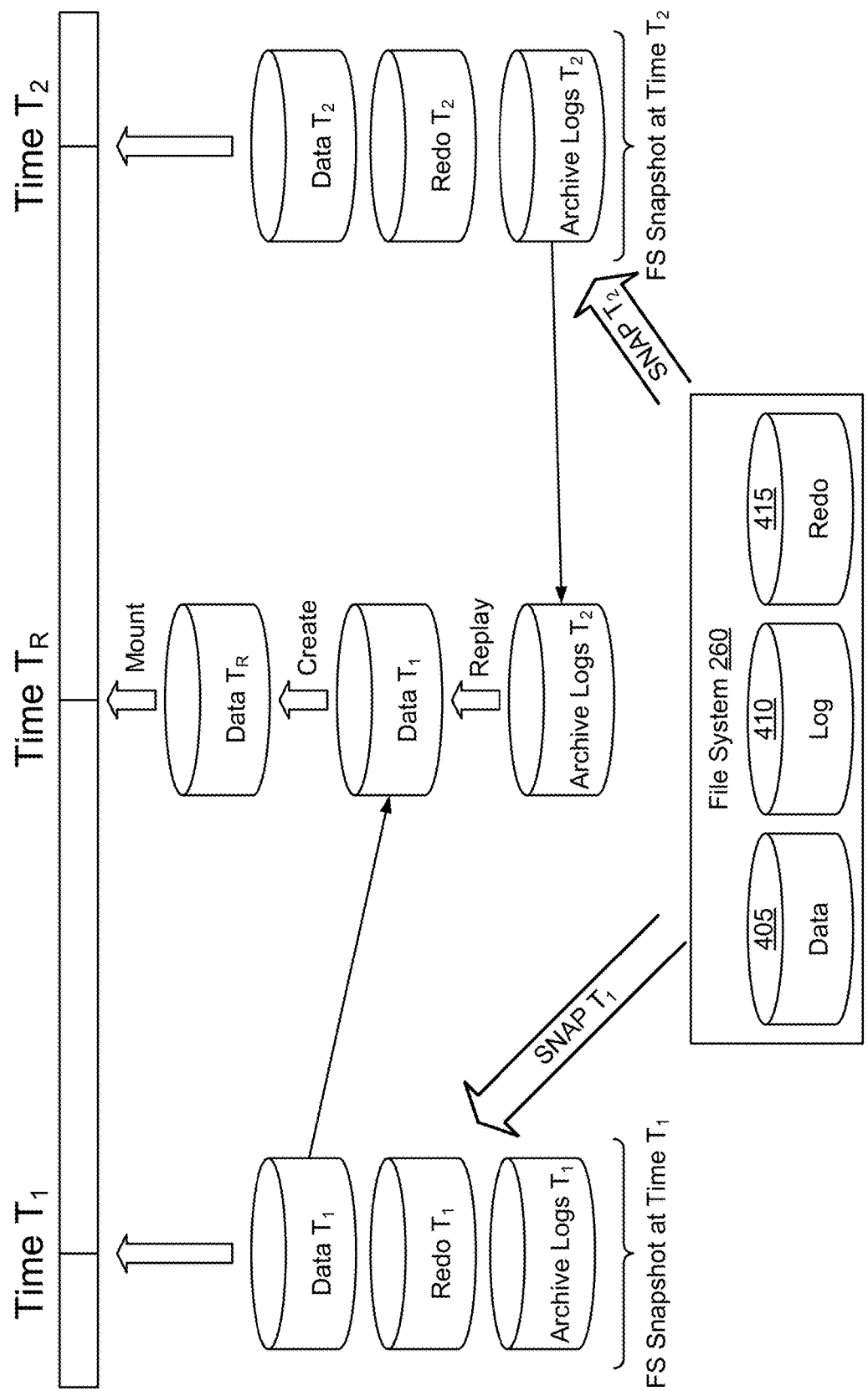
FIG. 4 is a functional block diagram illustrating selection of snapshots for generation of an application file system as the application file system appeared at a selected reconstruction time $T_R$ that is intermediate snapshot creation timepoints, according to some embodiments.

The ADMS system 250 enables a user, via the ADMS console 200, to cause application file systems 260 to be created, cause copies of application file systems 260 to be created, and to cause application file systems 260 or copies of application file systems 260 to be mounted or unmounted from particular application servers (hosts) 102. An example application file system 260 is shown in FIG. 4. The ADMS system 250 enables a user to manage the protection, replication, and repurposing of databases and applications. Example databases and applications include Oracle, Microsoft SQL Server, Microsoft Exchange, SAP HANA, and VMware data stores.

The ADMS system 250 controls the storage systems 100 providing backend storage resources for the application file systems 260 using copy data management and replication technologies provided by the storage systems 100. For example, in some embodiments, as shown in FIG. 2, the ADMS system 250 enables a reproduction data facility 240 to be created between a pair of storage systems R1, R2. Creation of the reproduction data facility 240 causes a copy of the application file system 260 to be transmitted from storage system R1 to storage system R2, and causes changes to the application file system 260 on storage system R1 to be automatically mirrored by storage system R1 to storage system R2. Although FIG. 2 shows only the application file system 260 being replicated in this manner, snapshots 215 of the application file system can also be replicated on the reproduction data facility as well. In this manner, the ADMS system 250 can orchestrate creation of multiple copies of the application file system 260 on multiple storage systems 100, to enable backup of the application file system 260 from storage system R2 in the event that the application file system 260 becomes unavailable at storage system R1.

The ADMS system 250 also allows a user, via ADMS console 200, to control creation of point in time copies (snapshots 215) of the application file system 260 by the storage system 100 that is maintaining the application file system 260. As shown in FIG. 4, an application file system 260 frequently has multiple volumes that collectively are used by the application to store data. For example, a given application file system 260 may include a data file 405 containing the data itself, a log file 410 that identifies a history of changes that have been to the data file, and a redo file 415 that enables the application file system 260 to be rewound to an earlier known good point in time, in the event of a failure of a particular operation on the application file system 260.

All storage volumes required for execution by an application are collectively referred to herein as an "application file system 260." Accordingly, as shown in FIG. 4, in embodiments where the application requires access to a data storage volume 405, log storage volume 410, and redo storage volume 415, the set of those three storage volumes is collectively referred to herein as an "application file system 260." A given application file system 260 may have additional storage volumes or fewer storage volumes, depending on the type of application associated with the application file system 260 and, accordingly, the application file system 260 shown in FIG. 4 is merely one possible example.

A "snapshot of a storage volume" as that term is used herein, is a point-in-time copy of the storage volume. A "snapshot of an application file system 260," accordingly, includes multiple independent point in time copies of each of the storage volumes 405, 410, 415 that collectively make up the application file system 260. A group of snapshots, such as the group of snapshots that are created on each of the storage volumes 405, 410, 415, is often referred to as a "snapset". However, for convenience, the snapset of individual snapshots on the storage volumes 405, 410, 415, are collectively referred to herein as a "snapshot of the application file system", it being understood that the "snapshot of the application file system" is actually a snapset containing a group of snapshots, one snapshot taken on each of the respective data storage volume 405, log storage volume 410, and redo storage volume 415. Where the application file system 260 contains additional storage volumes, the "snapshot of the application file system" would include a snapset of each of the storage volumes used by the application.

To create a snapset of the set of storage volumes 405, 410, 415 associated with an application file system 260, input/output (IO) operations on the application file system 260 are quiesced by the storage system 100, a snapshot of each storage volume 405, 410, 415 of the application file system 260 is created by the storage system 100, and then IO operations on the application file system 260 resume.

The ADMS system 250 enables service plans to be attached to file systems 260, that provide end-to-end automation of all the steps associated with protecting an application file system using snapshots, from application discovery and storage mapping, all the way to mounting of the copies of the application file system 260 to the target hosts 102. Depending on the implementation, the ADMS system 250 may monitor protection of the application file system 260 and generate alerts if a service plan fails or if the storage systems 100 are not able to meet service level objectives for the particular file system 260.

Snapshots 215 of a file system 260 may be created, as specified in the service plan, by the storage system 100 hosting the application file system 260. Depending on the service plan, the storage system 100 may create snapshots 215 at any desired cadence, for example on an hourly, daily, or weekly basis, and snapshots 215 may also be created on-demand.

If the application file system 260 is to be restored to an earlier point in time, a user can select a reconstruction time $T_R$ through the ADMS console 200, to cause the ADMS system 250 to create and mount the application file system 260 to a host 102 as the application file system 260 existed at the selected point in time. According to some embodiments, the ADMS system 250 enables a user to select any desired reconstruction time ($T_R$), regardless of whether a snapshot of the application file system 260 had been created at the particular selected reconstruction time $T_R$.

If the application file system is to be restored to an earlier point in time, conventionally the ADMS console 200 would enable the user to select one of the previous application file system snapshots 215 to cause the application file system 260 to be rolled back to the point in time of creation of the selected application file system snapshot 215. According to some embodiments, the ADMS console 200 enables a user to select any previous reconstruction time ($T_R$). If the reconstruction time $T_R$ that is selected falls intermediate application file system snapshot 215 creation timepoints, the ADMS system 250 creates a version of the application file system at the selected reconstruction time $T_R$ using a snapshot of the data file of the application file system snapshot 215 from a previous snapshot creation timepoint, and a snapshot of the log file of the application file system 215 from a subsequent snapshot creation timepoint. The snapshot of the log file from the subsequent snapshot creation timepoint contains a log of transactions that occurred on the data file of the application file system from the previous snapshot creation timepoint up until the subsequent snapshot creation timepoint. The ADMS uses the snapshot of the log file, from the subsequent application file system snapshot creation timepoint, to replay transactions on the snapshot of the data file of the previous application file system snapshot creation timepoint up to the selected reconstruction time $T_R$. This enables the ADMS system to recreate the state of the application file system 260 at any arbitrary selected reconstruction time $T_R$, even if the selected reconstruction time $T_R$ is not coincident with application file system snapshot creation timepoints. The ADMS system 250 then mounts the version of the application file system that was created the selected reconstruction time $T_R$ to a host 102 for use by the application.

Figure 3:
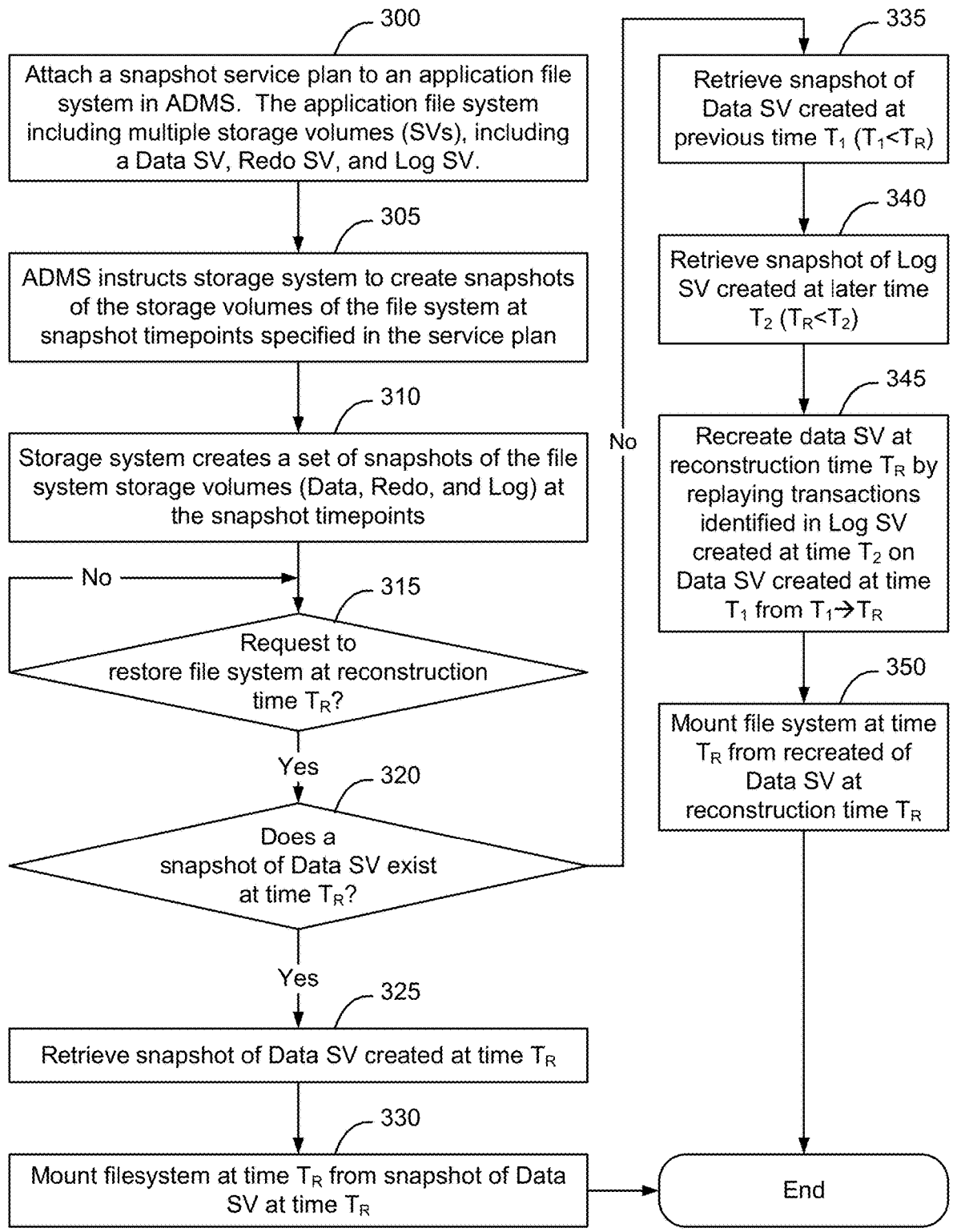
FIG. 3 is a flow chart of an example method of automatic mounting of an application file system intermediate snapshot creation timepoints, according to some embodiments.

FIG. 3 is a flow chart of an example method of automatic mounting of an application file system 260 intermediate snapshot creation timepoints, according to some embodiments. As shown in FIG. 3, in some embodiments, a service plan is attached to application file system 260 using the ADMS 250 (block 300). The application file system 260 includes several storage volumes, including a data storage volume 405, a log storage volume 410, and a redo storage volume 415. The data storage volume 405 contains the data of application file system 260 at the particular point in time when the file system snapshot 260 was created, and the log storage volume 410 identifies transactions (write operations) that have occurred on the data storage volume 405 that resulted in changes of the data contained in the data storage volume 405 since a point in time when a previous file system snapshot 260 was created. Read operations may also be logged, depending on the embodiment, but do not change the content of the data storage volume 405 and, accordingly, for purposes of this discussion have been omitted.

The ADMS system 250 instructs the storage system 100 to create snapshots of the storage volumes 405, 410, 415, of the application file system 260 at snapshot timepoints specified in the snapshot service plan (block 305). At the intended snapshot timepoints, the storage system creates a file system snapshot 215, which includes a snapshot of each of the storage volumes that collectively constitute the file system 260, namely data storage volume 405, log storage volume 410, and redo storage volume 415 of the application file system 260 (block 310). Where the application file system 260 includes other storage volumes, the snapshot 215 will include snapshots of each of the other storage volumes as well.

The ADMS system 250 presents the user with a ADMS console User Interface (UI) 200, and in some embodiments one of the options that the user is able to implement via the user interface 200 is to instruct the ADMS system 250 to restore the application file system 260 to a state that the application file system 260 was in at an earlier point in time. The selected earlier point in time is referred to herein as a "reconstruction time $T_R$". If the ADMS system 250 receives a request to restore the application file system 260 to a state as the application file system existed at a particular selected reconstruction time $T_R$ (a determination of YES at block 315), the ADMS system 250 determines whether a snapshot of the data storage volume 405 of the application file system 260 was created at the selected reconstruction time $T_R$ (block 320).

If a snapshot of the data storage volume 405 of the application file system 260 was created at the selected reconstruction time $T_R$ (a determination of YES at block 320), the ADMS system 250 retrieves the snapshot of the data storage volume 405 created at the selected reconstruction time $T_R$ (block 325) and mounts the application file system 260 at the selected reconstruction time $T_R$ from the snapshot of the data storage volume 405 that was taken at the selected reconstruction time $T_R$ (block 330).

If a snapshot of the data storage volume 405 of the application file system 260 was not created at the selected reconstruction time $T_R$ (a determination of NO at block 320), the ADMS system 250 will need to recreate the data storage volume of the application file system 260 at the selected reconstruction time $T_R$. According to some embodiments, the ADMS system 250 retrieves a snapshot of the data storage volume 405 created at a point in time $T_1$ before the selected reconstruction time $T_R$ (block 335). In some embodiments, the ADMS system 250 retrieves the snapshot of the data storage volume that was created at a point in time $T_1$ that is closest in time to the selected reconstruction time $T_R$ and prior to the selected reconstruction time $T_R$, such that $T_1 < T_R$.

The ADMS system 250 also retrieves a snapshot of the log storage volume 410 that was created at a point in time $T_2$ after the selected reconstruction time $T_R$ (block 340). In some embodiments, the ADMS retrieves the snapshot of the log storage volume 410 that was created at a point in time $T_2$ that is closest in time to the selected reconstruction time $T_R$ and subsequent to the selected reconstruction time $T_R$, such that $T_R<T_2$.

In this manner the time $T_1$ and $T_2$ are selected such that $T_1<T_R<T_2$. By selecting the snapshot of the data storage volume 405 that was created at a point in time $T_1$ that is closest in time to the selected reconstruction time $T_R$ and prior to the selected reconstruction time $T_R$, and selecting the snapshot of the log storage volume 410 that was created at a point in time $T_2$ that is closest in time to the selected reconstruction time $T_R$ and subsequent to the selected reconstruction time $T_R$, it is possible to replay the transactions contained in the $T_2$ snapshot of the log storage volume 410 on the content of the $T_1$ snapshot of the data storage volume 405, to recreate the data storage volume 405 at the selected reconstruction time $T_R$. Specifically, as shown in FIG. 3, the ADMS system 250 recreates the data storage volume 405 at the reconstruction time $T_R$ by replaying transactions identified in the $T_2$ snapshot of the log storage volume 410 on the $T_1$ snapshot of the data storage volume 405 from Time=$T_1$ until Time=$T_R$. By replaying the transactions identified in the $T_2$ snapshot of the log storage volume 410, it is possible to implement changes to the data contained in the snapshot of the data storage volume 405 that was taken at time $T_1$ to evolve the data of the data storage volume to reflect the state of the application file system 260 at the selected reconstruction time $T_R$. The ADMS system 250 then mounts the application file system 260 using the data storage volume 405 created at the reconstruction time $T_R$ and the process ends.

FIG. 4 is a functional block diagram illustrating selection of snapshots 405, 410, for reconstruction of an application file system 260 as the application file system 260 appeared at a selected reconstruction time $T_R$ that is intermediate application file system snapshot 215 creation timepoints, according to some embodiments. As shown in FIG. 4, in this example the selected reconstruction time $T_R$ is intermediate a first application file system snapshot 215 creation timepoint $T_1$ and a second application file system snapshot creation timepoint $T_2$. To recreate the application file system 260 at the selected reconstruction time $T_R$, the ADMS system 250 retrieves a snapshot of the data storage volume 405 at created time=$T_1$, and retrieves a snapshot of the log storage volume 410 created at time=$T_2$. The ADMS then replays the transactions captured in the $T_2$ snapshot of the log storage volume 410 on the $T_1$ snapshot of the data storage volume 405 from time=$T_1$ until time=$T_R$. Replaying the transactions captured in the $T_2$ snapshot of the log storage volume 410 causes the data of the $T_1$ snapshot of the data storage volume 405 to evolve from the state of the data storage volume 405 at time=$T_1$ (when the previous application file system snapshot was created) to the state of the data storage volume at time=$T_R$ (the selected reconstruction time).

Figure 5:
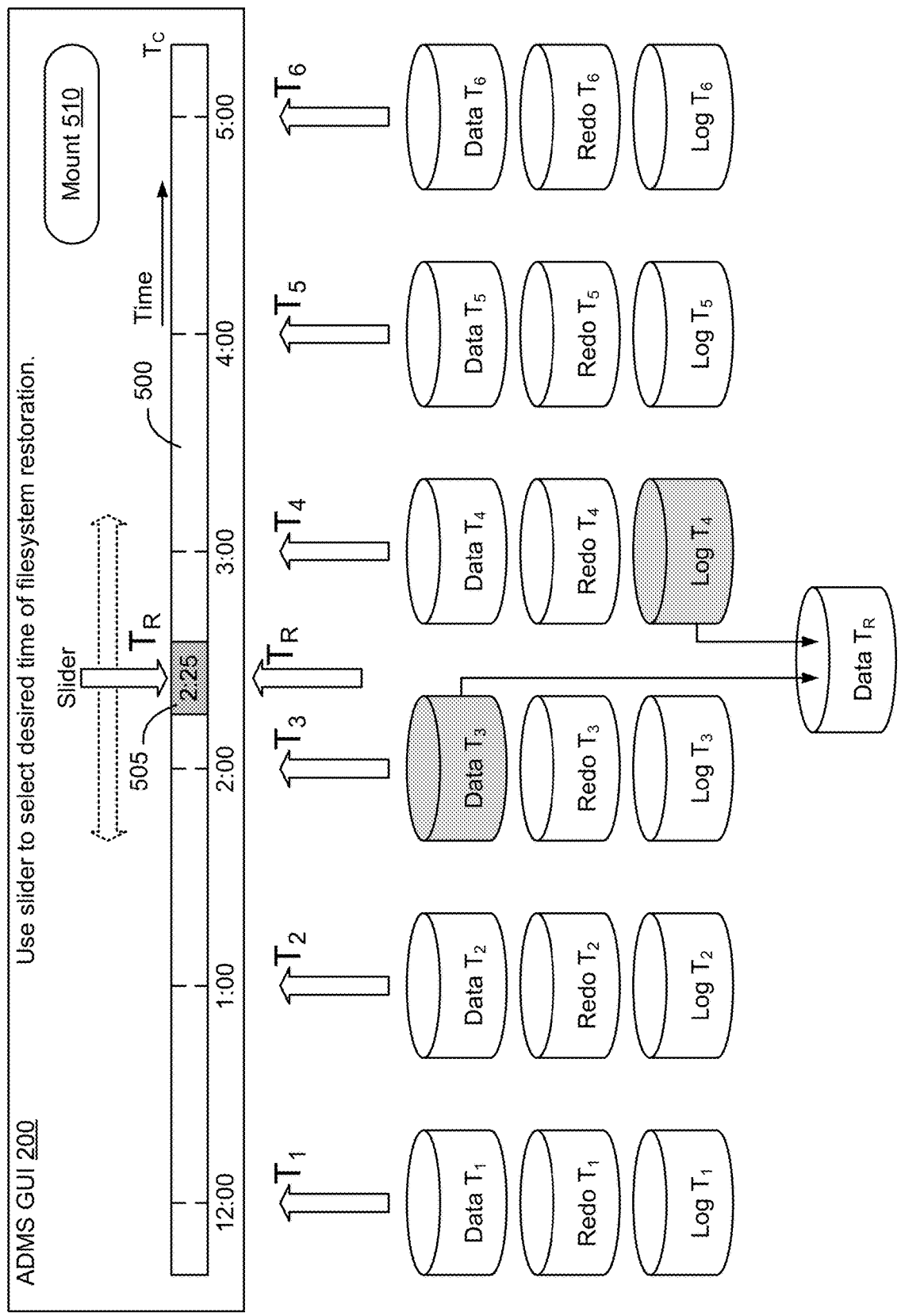
FIGS. 5 and 6 are functional block diagrams of an example Graphical User Interface of an ADMS console, enabling selection of a reconstruction time $T_R$ for automatic generation and mounting of an application file system as the application file system existed at a point that is intermediate snapshot creation timepoints, according to some embodiments.
Figure 6:
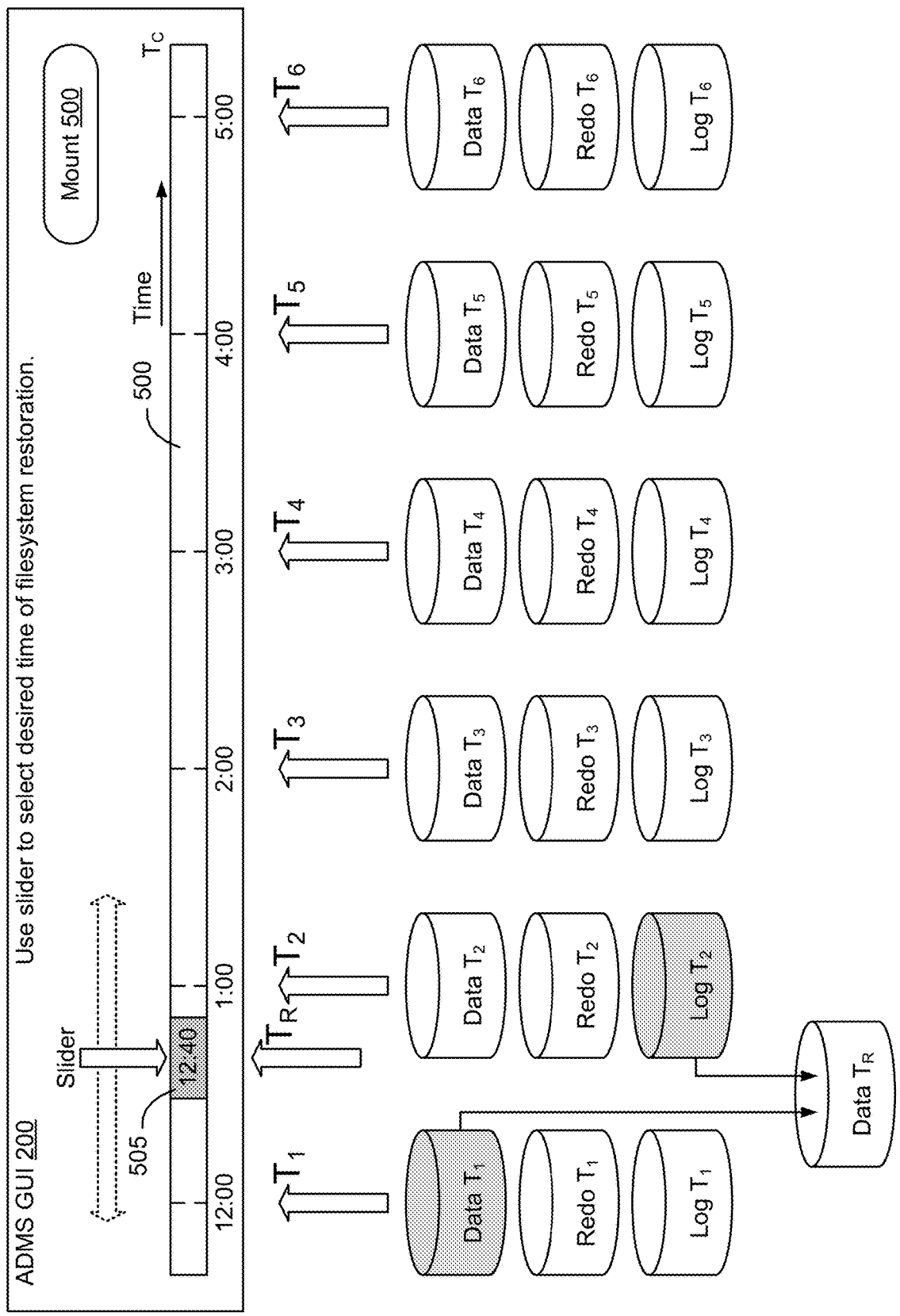

FIGS. 5 and 6 are functional block diagrams of an example Graphical User Interface 200 of an example ADMS system 250, enabling selection of a reconstruction time $T_R$ for automatic generation and mounting of an application file system 260 as the application file system 260 existed at a point that is intermediate application file system snapshot 215 creation timepoints, according to some embodiments. As shown in FIG. 5, in some embodiments the ADMS system 250 has a graphical user interface (GUI) 200 that is configured to present the user with the ability to select a desired time of restoration $T_R$ of the application file system 260. In some embodiments, the user interface 200 includes a timeline 500 showing the current time $T_C$ on the right, and a slider 505 that is able to be moved laterally along the timeline 500, to enable a selected reconstruction time $T_R$ to be specified via the user interface 200. In some embodiments, the reconstruction time $T_R$ is shown on the slider and changes as the slider is moved laterally along the timeline 500. For example, in FIG. 5 the slider is positioned at a location on timeline 500 that is associated with a reconstruction time of 2:25, which is shown on the slider 505. In FIG. 6, the slider is positioned at a location on timeline 500 that is associated with a reconstruction time of 12:40, and the time shown on the slider has been changed accordingly. Optionally, the timeline 500 may visually indicate when application file system snapshots 215 have been created, as indicated by the dashed lines, to enable the user to visually confirm compliance with the snapshot service plan by the ADMS system 250.

Once the slider 505 has been moved to the selected location, which is 2:25 in FIG. 5 or 12:40 in FIG. 6, the user can select the "Mount" button 510. If the selected reconstruction time $T_R$ happens to coincide with one of the snapshot creation timepoints, such as T1=12:00, T2=1:00, etc., the ADMS system 250 will select the snapshot of the data storage volume 405 created at that point in time, and automatically mount the application file system 260 using the selected snapshot of the data storage volume 405. If the selected reconstruction time $T_R$ does not coincide with one of the snapshot creation timepoints, such as T1=12:00, T2=1:00, etc., the ADMS will recreate the data storage volume at the selected reconstruction time $T_R$ using the snapshot of the data storage volume 405 from a preceding application file system snapshot 215, and a snapshot of the log file 410 from a subsequent application file system snapshot 215, and automatically mount the application file system 260 using the recreated snapshot of the data storage volume 405 recreated at the selected reconstruction time $T_R$.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of mounting an application file system intermediate application file system snapset creation timepoints, comprising:
    generating a Graphical User Interface (GUI) of an Application Data Management System (ADMS) the GUI containing a timeline, a slider movable relative to the timeline, and a mount button, the timeline including visual indications when application file system snapsets have been created;
    causing, by the ADMS, a plurality of application file system snapsets to be created at application file system snapset creation timepoints by a storage system and stored for future use, each application file system snapset containing a snapshot of a data storage volume of the application file system and a snapshot of a log storage volume of the application file system, the snapshot of the log storage volume containing a record of transactions that occurred on the data storage volume since creation of a previous snapset, each respective snapshot of the log storage volume being created at a same point in time as creation of a corresponding snapshot of the data storage volume;
    receiving a first input by the ADMS in connection with movement of the slider on the timeline of the GUI of the ADMS, the movement of the slider on the timeline comprising an instruction to the ADMS to select a reconstruction time $T_R$ based on a position of the slider on the timeline;
    after receiving the first input in connection with movement of the slider on the timeline to select the reconstruction time $T_R$, receiving a second input by the ADMS in connection with selection of the mount button of the GUI of the ADMS, selection of the mount button comprising an instruction to the ADMS to mount the application file system at the selected reconstruction time $T_R$;
    after receiving the second input, determining, by the ADMS, that the selected reconstruction time $T_R$ is intermediate between two of the application file system snapset creation timepoints;
    in response to determining that the selected reconstruction time $T_R$ is intermediate between the two of the application file system snapset creation timepoints, automatically identifying by the ADMS a first application file system snapset created at a first point in time $T_1$ that is closest in time to the selected reconstruction time $T_R$ and before the selected reconstruction time $T_R$, and identifying by the ADMS a second application file system snapset created at a second point in time $T_2$ that is closest in time to the selected reconstruction time $T_R$ and subsequent to the selected reconstruction time $T_R$;
    automatically retrieving, by the ADMS, a first previously created snapshot of the data storage volume from the first application file system snapset that was created at the first point in time $T_1$;
    automatically retrieving, by the ADMS, a second previously created snapshot of the log storage volume from the second application file system snapset that was created at the second point in time $T_2$;
    automatically replaying, by the ADMS, a subset of transactions from the second previously created snapshot of the log storage volume on the first previously created snapshot of the data storage volume from the first point in time $T_1$ until the selected reconstruction time $T_R$, to create a version of the application file system as the application file system existed at the selected reconstruction time $T_R$ intermediate between the two of the application file system snapset creation timepoints; and
    automatically mounting, by the ADMS, the version of the application file system as the application file system existed at the selected reconstruction time $T_R$ to a host computer;
    wherein the snapshot of the data storage volume is a point in time copy of the data storage volume as the data storage volume existed at a particular point in time, and the snapshot of the log storage volume is a point in time copy of the log storage volume as the log storage volume existed at the particular point in time.

2. The method of claim 1, wherein the step of causing the plurality of application file system snapsets to be created comprises attaching a service plan to the application file system by the ADMS, the service plan specifying the application file system snapset creation timepoints to the storage system.

3. The method of claim 1, wherein the step of obtaining the first snapshot of the data storage volume from the first application file system snapset comprises obtaining the first snapshot of the data storage volume by the ADMS from the storage system; and
    wherein the step of obtaining the second snapshot of the log storage volume from the second application file system snapset comprises obtaining the second snapshot of the log storage volume by the ADMS from the storage system.

4. The method of claim 1, wherein the second point in time $T_2$ is a time other than a current time $T_C$.

5. The method of claim 1, wherein the step of obtaining the request to mount the application file system at the selected reconstruction time $T_R$ occurs at a current time $T_C$; and wherein both the first application file system snapset and the second application file system snapset were created before the current time $T_C$.

6. The method of claim 1, further comprising displaying the selected reconstruction time $T_R$ associated with the position of the slider on the timeline.

7. The method of claim 6, further comprising adjusting the selected reconstruction time $T_R$ displayed on the slider as the position of the slider is changed on the timeline.

8. A non-transitory tangible computer readable storage medium having stored thereon a computer program for mounting an application file system intermediate application file system snapset creation timepoints, the computer program including a set of instructions which, when executed by a computer, cause the computer to perform a method comprising the steps of:
    generating a Graphical User Interface (GUI) of an Application Data Management System (ADMS) the GUI containing a timeline, a slider movable relative to the timeline, and a mount button, the timeline including visual indications when application file system snapsets have been created;

causing, by the ADMS, a plurality of application file system snapsets to be created at application file system snapset creation timepoints by a storage system and stored for future use, each application file system snapset containing a snapshot of a data storage volume of the application file system and a snapshot of a log storage volume of the application file system, the snapshot of the log storage volume containing a record of transactions that occurred on the data storage volume since creation of a previous snapset, each respective snapshot of the log storage volume being created at a same point in time as creation of a corresponding snapshot of the data storage volume;

receiving a first input by the ADMS in connection with movement of the slider on the timeline of the GUI of the ADMS, the movement of the slider on the timeline comprising an instruction to the ADMS to select a reconstruction time $T_R$ based on a position of the slider on the timeline;

after receiving the first input in connection with movement of the slider on the timeline to select the reconstruction time $T_R$, receiving a second input by the ADMS in connection with selection of the mount button of the GUI of the ADMS, selection of the mount button comprising an instruction to the ADMS to mount the application file system at the selected reconstruction time $T_R$;

after receiving the second input, determining, by the ADMS, that the selected reconstruction time $T_R$ is intermediate between two of the application file system snapset creation timepoints;

in response to determining that the selected reconstruction time $T_R$ is intermediate between the two of the application file system snapset creation timepoints, automatically identifying by the ADMS a first application file system snapset created at a first point in time $T_1$ that is closest in time to the selected reconstruction time $T_R$ and before the selected reconstruction time $T_R$, and identifying by the ADMS a second application file system snapset created at a second point in time $T_2$ that is closest in time to the selected reconstruction time $T_R$ and subsequent to the selected reconstruction time $T_R$;

automatically receiving, by the ADMS, a first previously created snapshot of the data storage volume from the first application file system snapset that was created at the first point in time $T_1$;

automatically receiving, by the ADMS, a second previously created snapshot of the log storage volume from the second application file system snapset that was created at the second point in time $T_2$;

automatically replaying, by the ADMS, a subset of transactions from the second previously created snapshot of the log storage volume on the first previously created snapshot of the data storage volume from the first point in time $T_1$ until the selected reconstruction time $T_R$, to create a version of the application file system as the application file system existed at the selected reconstruction time $T_R$ intermediate between the two of the application file system snapset creation timepoints; and automatically mounting, by the ADMS, the version of the application file system as the application file system existed at the selected reconstruction time $T_R$ to a host computer;

wherein the snapshot of the data storage volume is a point in time copy of the data storage volume as the data storage volume existed at a particular point in time, and the snapshot of the log storage volume is a point in time copy of the log storage volume as the log storage volume existed at the particular point in time.

9. The non-transitory tangible computer readable storage medium of claim 8, wherein the step of causing the plurality of application file system snapsets to be created comprises attaching a service plan to the application file system by the ADMS, the service plan specifying the application file system snapset creation timepoints to the storage system.

10. The non-transitory tangible computer readable storage medium of claim 8, wherein the step of obtaining the first snapshot of the data storage volume from the first application file system snapset comprises obtaining the first snapshot of the data storage volume by the ADMS from the storage system; and wherein the step of obtaining the second snapshot of the log storage volume from the second application file system snapset comprises obtaining the second snapshot of the log storage volume by the ADMS from the storage system.

11. The non-transitory tangible computer readable storage medium of claim 8, wherein the second point in time $T_2$ is a time other than a current time $T_C$.

12. The non-transitory tangible computer readable storage medium of claim 8, wherein the step of obtaining the request to mount the application file system at the selected reconstruction time $T_R$ occurs at a current time $T_C$; and wherein both the first application file system snapset and the second application file system snapset were created before the current time $T_C$.

13. The non-transitory tangible computer readable storage medium of claim 8, further comprising displaying the selected reconstruction time $T_R$ associated with the position of the slider on the timeline.

14. The non-transitory tangible computer readable storage medium of claim 13, further comprising adjusting the selected reconstruction time $T_R$ displayed on the slider as the position of the slider is changed on the timeline.

* * * * *